(12) United States Patent
Tümpner

(10) Patent No.: US 7,991,209 B2
(45) Date of Patent: Aug. 2, 2011

(54) METHOD AND DEVICE FOR SCANNING A SAMPLE WITH CONTRAST EVALUATION

(75) Inventor: Jürgen Tümpner, Münster (DE)

(73) Assignee: Olympus Soft Imaging Solutions GmbH, Münster (DE)

( * ) Notice: Subject to any disclaimer, the term of this patent is extended or adjusted under 35 U.S.C. 154(b) by 871 days.

(21) Appl. No.: 11/920,894

(22) PCT Filed: May 23, 2006

(86) PCT No.: PCT/EP2006/004898
§ 371 (c)(1),
(2), (4) Date: Jan. 14, 2008

(87) PCT Pub. No.: WO2006/125607
PCT Pub. Date: Nov. 30, 2006

(65) Prior Publication Data
US 2008/0240528 A1    Oct. 2, 2008

(30) Foreign Application Priority Data

May 25, 2005 (DE) .......................... 10 2005 024 063

(51) Int. Cl.
*G06K 9/00* (2006.01)
*G02B 21/00* (2006.01)
(52) U.S. Cl. .................... 382/128; 382/255; 359/368
(58) Field of Classification Search .................. 382/100, 382/103, 106, 107, 128, 129, 130, 162, 149, 382/168, 173, 181, 193, 199, 232, 253, 255, 382/274, 276, 286, 305, 312, 318, 321; 250/201.3; 359/368, 383; 435/7.2; 345/641
See application file for complete search history.

(56) References Cited

U.S. PATENT DOCUMENTS 4,760,385 A * 7/1988 Jansson et al. ................ 345/641
4,902,101 A * 2/1990 Fujihara et al. ............... 359/383
(Continued)

FOREIGN PATENT DOCUMENTS

DE    37 35 091    3/1998
(Continued)

OTHER PUBLICATIONS

International Search Report.

*Primary Examiner* — Seyed Azarian
(74) *Attorney, Agent, or Firm* — Collard & Roe, P.C.

(57) ABSTRACT

The invention relates to a method and to a device for optically scanning a sample (1). The device comprises an adjusting unit (2, 3) and a scanning device (4, 5) which comprises an optical unit (4) and a scanning unit (5). The inventive device also comprises a control arrangement (6) which controls the optical unit (4), the scanning unit (5) and the adjusting unit (2, 3). The sample (1) is displaced in relation to the scanning device (4, 5), or vice-versa, by means of the adjusting unit (2, 3) which is impinged upon by the control arrangement (6). As a result, individual images (7), which are obtained by means of the scanning device (4, 5) are assembled to make at least one global image in the control arrangement (6). According to the invention, the respectively detected individual image (7) is evaluated either partially or totally in relation to the contrast thereof, and the obtained contrast values (K) influence the functionality of the entire arrangement.

9 Claims, 6 Drawing Sheets

U.S. PATENT DOCUMENTS

Figure 5:
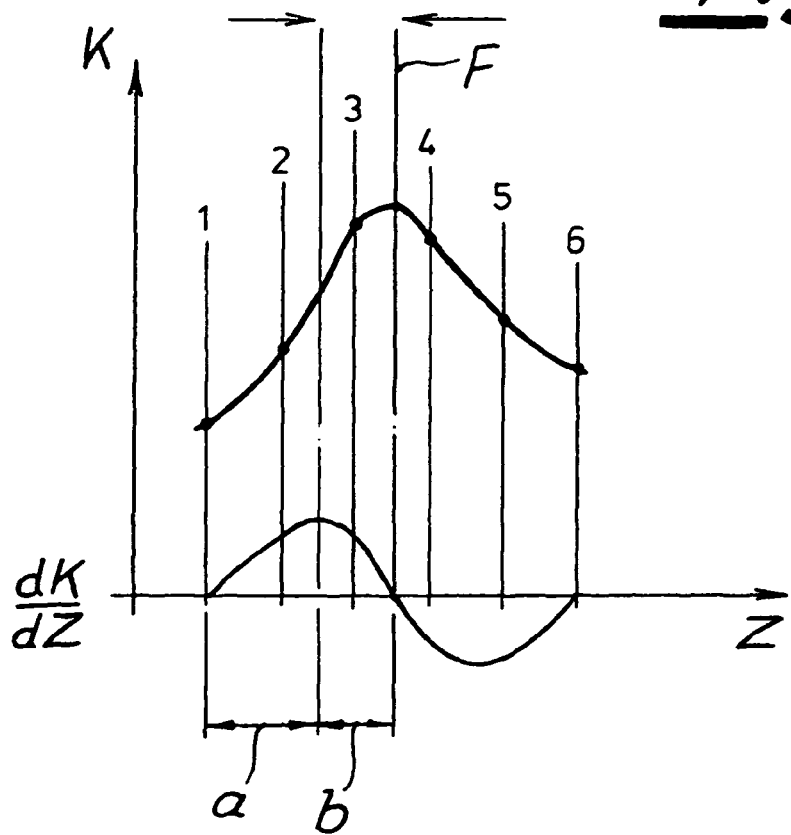

| | | | |
|---|---|---|---|
| 5,023,917 A * | 6/1991 | Bose et al. | 382/149 |
| 5,526,258 A * | 6/1996 | Bacus | 382/129 |
| 5,710,662 A * | 1/1998 | Nishida | 359/368 |
| 6,259,080 B1 * | 7/2001 | Li et al. | 250/201.3 |
| 6,620,591 B1 * | 9/2003 | Dunlay et al. | 435/7.2 |
| 2005/0089208 A1 | 4/2005 | Dong et al. | |

FOREIGN PATENT DOCUMENTS

| | | |
|---|---|---|
| EP | 0 459 004 | 12/1991 |
| WO | WO 2004/095360 | 11/2004 |

* cited by examiner

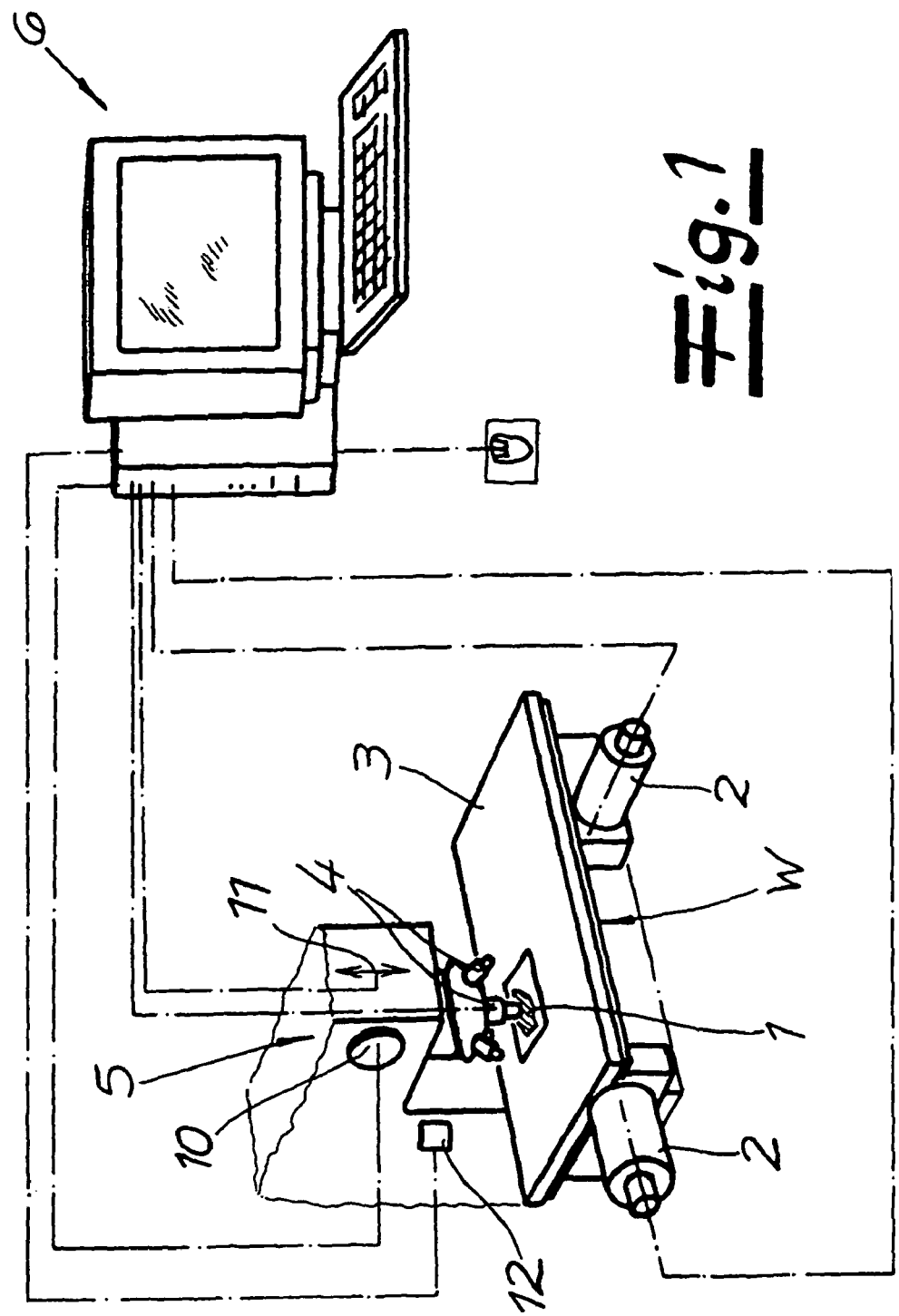

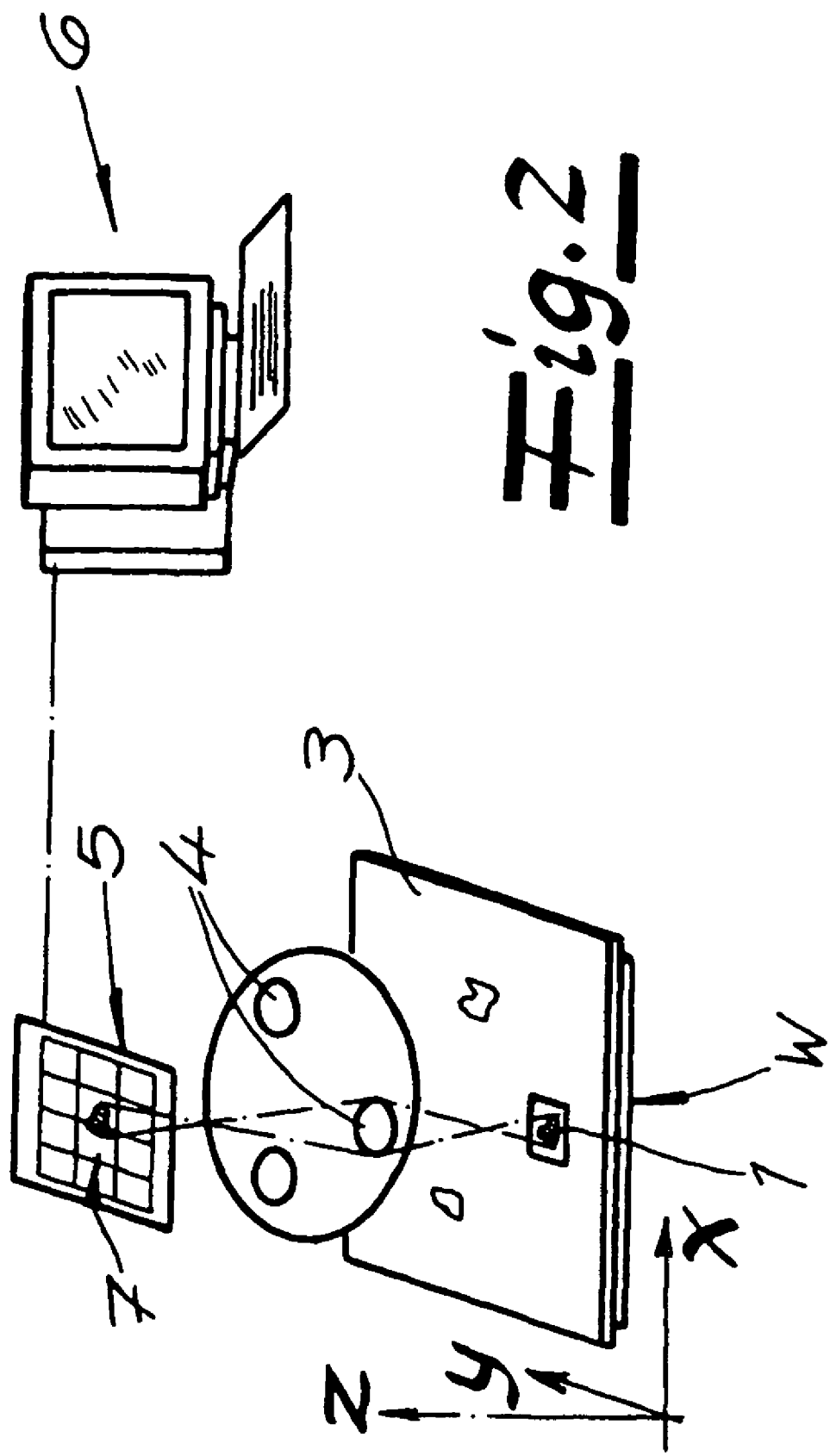

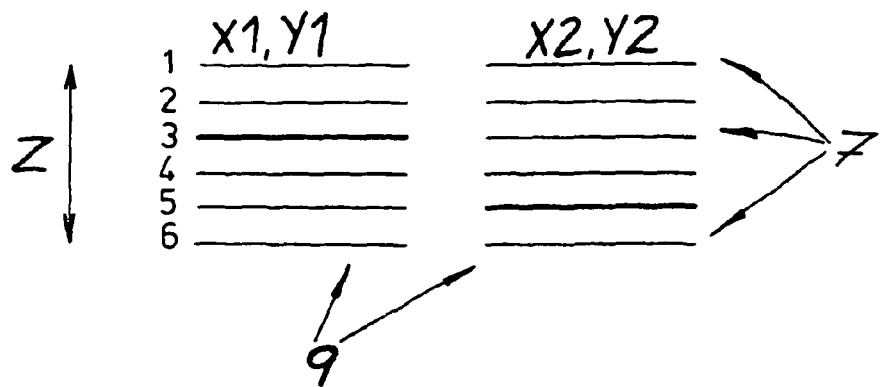
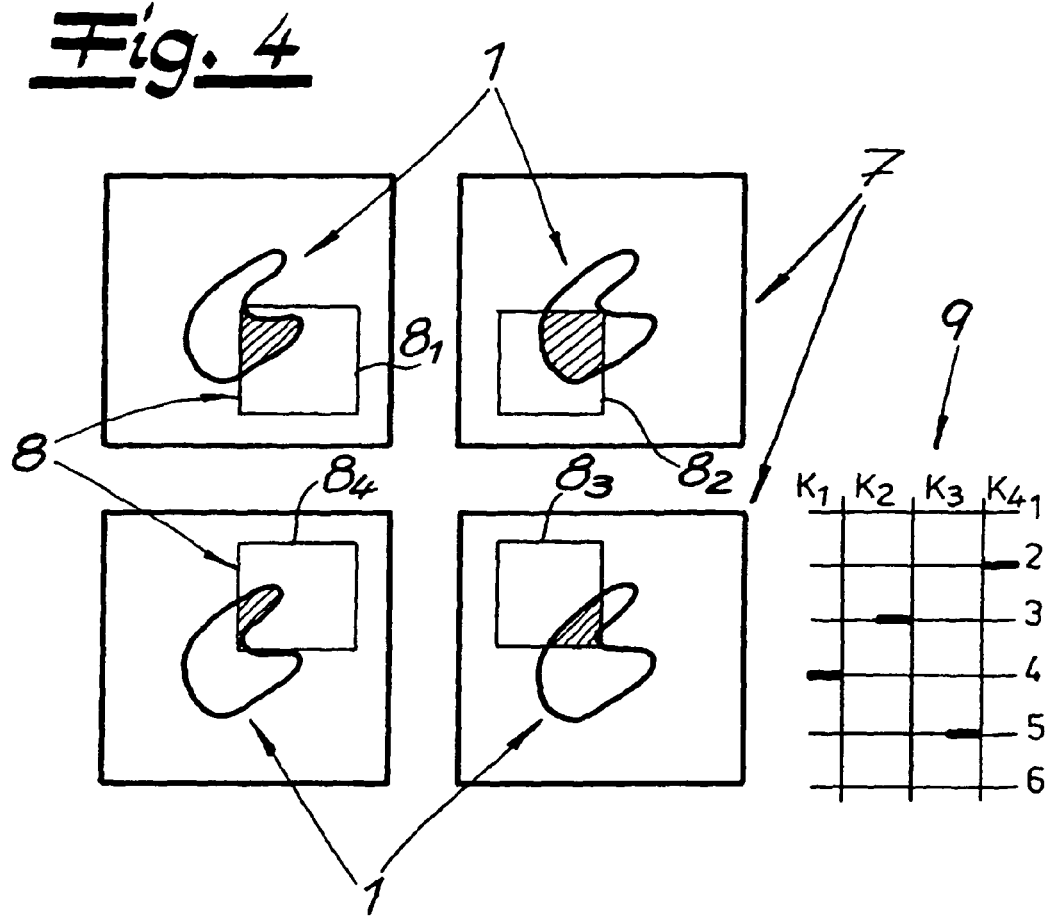

METHOD AND DEVICE FOR SCANNING A SAMPLE WITH CONTRAST EVALUATION

CROSS REFERENCE TO RELATED APPLICATIONS

Applicant claims priority under 35 U.S.C. §119 of German Application No. 10 2005 024 063.1 filed May 25, 2005. Applicant also claims priority under 35 U.S.C. §365 of PCT/EP2006/004898 filed May 23, 2006. The international application under PCT article 21(2) was not published in English.

The invention relates to a method for optically scanning a sample, having an adjustment unit and a scanning device having an optical unit and a scanning unit, and having a control system that controls the optical unit, the scanning unit, and the adjustment unit, according to which the sample is moved relative to the scanning device, by means of the adjustment unit activated by the control system, or vice versa, and according to which individual images obtained with the scanning device in this manner are combined in the control system to produce at least one total image.

In the case of such methods, a sample is usually examined with regard to its transmission, although reflection measurements are fundamentally also possible and are included. Usually, however, the absorption capacity of the sample is examined by transilluminating it with a (white-light) source. These samples can be biological sections, sections through materials, etc.

Because the scanning device can always record only a specific section segment of the sample with the desired resolution, the adjustment unit ensures that the individual image or the multiple individual images taken with the scanning unit are combined in the control system to produce at least one total image. The optical unit is, without restriction, one or more microscope lenses, while the scanning unit, i.e. recording unit is configured as a CCD chip (CCD=charge coupled device), for example. The optical unit, i.e. the CCD chip, is regularly situated in the image plane of the microscope lens, in each instance, in order to record the individual image and pass it on to the control system. The control system reads the recording unit, stores the individual image, in each instance and combines the stored individual images to produce the total image or several total images.

In the case of the state of the art that forms the type, such as it is described in U.S. Pat. No. 4,760,385, for example, automatic focusing of the optical unit takes place, without further details being discussed. This generalized method of procedure is connected with various disadvantages. For example, automatic focusing takes a relatively long time, if it is carried out for each individual image of the total image. This leads to unjustifiable processing periods. Also, manual intervention in the process is practically impossible. This means that an operator's request for focusing selected individual images is practically impossible to implement.

An optical system for cell-based scanning is presented within the framework of U.S. Pat. No. 6,620,591 B1. For this purpose, the cells contain fluorescent molecules in a localization region, and are recorded using a fluorescence microscope.

U.S. Pat. No. 5,526,258 describes a method and a device with which a pile of cells is imaged and individual objects undergo selection. The individual cell objects can be classified.

Finally, it is known from U.S. Pat. No. 5,023,917 to examine metallized regions on a substrate. These regions are compared with a model sample.

The invention is based on the technical problem of further developing a method of the configuration described initially, in such a manner that the processing speed is increased and operator wishes can easily be taken into consideration. Furthermore, a particularly suitable device is supposed to be created.

In order to solve this technical problem, a method of the stated type is characterized, within the framework of the invention, in that the individual image recorded, in each instance, is evaluated by means of an adaptive sensor unit, in other words a sensor unit that can be adapted, with regard to its contrast, in whole or in part, whereby the contrast values obtained in this manner influence the method of functioning of the entire system.

In fact, the contrast values of every individual image that is taken are evaluated in an adaptive sensor unit. The system is controlled as a function of the contrast values and possible additional parameters, such as the magnification, the depth of focus of the optical unit or of the image selected, in each instance, the desired image section, the resolution of the recording unit, etc. In this connection, the entire system adapts itself to the default values indicated above (particularly the contrast values, the magnification, the depth of focus, etc.), in other words it is configured adaptively.

In detail, the movement of the optical unit and/or the movement of the adjustment unit by means of the control system, in each instance, depend on the contrast values obtained and the possible additional parameters. Alternatively or in addition, the contrast values also influence the values read out of the scanning unit of the scanning device by the control system. In this connection, the invention first of all proceeds from the recognition that the contrast evaluation of the individual images—whether this contrast evaluation now takes place in sections or as a whole per individual image—is of decisive importance for focusing the optical unit. This is because both the mean value for brightness and the mean quadratic deviation provide data concerning the contrast. The greater the quadratic deviation of individual gray values $G_{i,j}$ from the mean value $\mu_G$ of the gray value, the greater the contrast in the individual image, in each instance.

In fact, the mean value $\mu_G$ of an individual image or gray image G, with Z lines and S columns, is calculated as follows:

$$\mu_G = \frac{1}{S \cdot Z} \sum_{i=o}^{Z-1} \sum_{j=o}^{S-1} G_{i,j} \qquad (1)$$

In this connection, the value Gi,j, in each instance, reproduces the gray value at the position i, j in the two-dimensional pixel image. The mean quadratic deviation of an image can now be calculated using the aforementioned mean value $\mu_G$ according to Equation (1), according to the formula $$\sigma_G^2 = \frac{1}{S \cdot Z} \sum_{i=o}^{Z-1} \sum_{j=o}^{S-1} G_{i,j}^2 - \mu_G^2 \qquad (2)$$

This process must, of course, be carried out separately for every channel (red, green, blue) in the case of multi-channel images, e.g. color images. In any case, a mean quadratic deviation $\sigma_G^2$ can be indicated, in accordance with Equation (2), for each individual image. The greater the value $\sigma_G^2$, the more contrast-rich the image. If one now records stacks of individual images at each position or at selected positions of the adjustment unit, i.e. individual images belong to different focusings, then the most contrast-rich individual image of the stack of individual images can be selected using Equation ②, i.e. referring back to the mean quadratic deviation $\sigma_G^2$, and can form the basis for the total image subsequently composed in the control system.

In place of referring back to the original image, i.e. individual image or gray image G, a gradient image can also be produced, in order to determine the contrast, i.e. to generate related contrast values and undertake focusing of the optical unit. In this connection, the gradient image is determined in such a manner that the difference from the adjacent pixels, in each instance—proceeding from a gray value $G_{i,j}$—is determined, averaged, if necessary, and stored as a new value $G_{i,j}$. For example, the gray value $G_{i,j}$ has a total of four adjacent gray values $G_{i+1,j}$; $G_{i-1,j}$; $G_{i,j+1}$ and $G_{i,j-1}$. In this connection, the individual differences from the gray value $G_{i,j}$ are now calculated and averaged. The mean value or gradient value is stored as a new gray value $G_{i,j}$ and subjected to the aforementioned calculation procedures for contrast evaluation.

In every case, the gradient image produced in this manner circumvents the so-called shading problem, which occurs both in focused images and in unfocused images. This means that the individual images usually obtained by means of transmission measurement are not subjected to uniform image illumination by the white-light source generally used at this location, due to system constraints. In this connection, a varying, non-uniform image illumination leads to the result that a gray-value histogram is equipped with a base or additional maxima caused by the shading behavior, for example. This can be avoided or mastered by means of the gradient image.

Furthermore, conclusions concerning the focus can be drawn from a gray-value histogram of the gradient image, supplementally or alternatively to the method described above. This is because if the gray-value histogram of the gradient image in question is flat, in other words does not have a marked base, focus is generally present. Also, an increase in light intensity can be evaluated as to whether or not focus is achieved.

Furthermore, it has proven itself if the optical unit is focused by means of the control system and/or manually, whereby the focusing speed is predetermined and, if necessary, varied by the control system, as a function of the contrast values of the individual image taken, in each instance. This means that the focusing speed is a function of the focus value or contrast value, in each instance. Furthermore, the focusing speed usually also depends on the parameters indicated above. In this connection, one will generally work with high focusing speeds for the optical unit as long as the contrast clearly increases from individual image to individual image. However, as soon as this increase in contrast, i.e. the values for the quadratic deviation assume an incline that is no longer as great, one comes into the region of maximal contrast, and thus the greatest possible focus. The focusing speed is now reduced as a function of this.

In this connection, the direction of the focusing speed of the optical unit can also be reversed, if necessary, if the point of greatest possible focus has already been exceeded. For this purpose, the contrast can be evaluated as a function of the focusing, i.e. adjustment of the optical unit in the Z direction, i.e. its progression can be recorded and analyzed.

Every individual image or selected individual images of the stack of individual images can be examined by sections, with regard to their contrast. In this connection, the most contrast-rich sections and/or individual images are combined to produce the individual image combined from the most contrast-rich sections, or total image. This means it is possible to divide each individual image into practically several sections, in the case of a stack of individual images, and to select the most contrast-rich sections of each individual image, in each instance. If one continues this process for each individual image of the stack of individual images, an individual image composed from individual particularly contrast-rich sections or pixel environments or (pixel) clusters can be produced and stored in the control system.

A similar method of procedure can be used in the production of the total image. Here again it is possible to select the most contrast-rich individual image from the stack of individual images, in each instance, and then to combine the individual images to produce the total image. Of course, the method of procedure described above can precede this procedure, in other words the most contrast-rich sections are selected from the stack of individual images and combined to produce the resulting individual image, and only then are the individual images combined to produce the total image.

Another object of the invention is a device for optically scanning a sample, which is particularly but not restrictively suited for carrying out the method described. Advantageous embodiments of this device are described in claims 9 and 10.

In the end result, a method and a device are presented that make it possible to clearly increase the scanning speed. This is essentially attributable to the fact that in the case of automatic or manual focusing of each individual image, the work is no longer carried out at a fixed, predetermined focusing speed, but rather this focusing speed depends on the contrast, in each instance, i.e. the recorded contrast values and other parameters. The focusing speed of the optical unit is regularly reduced—proceeding from a predetermined (maximal) value—as a function of the contrast values, in order to be able to perfectly record the region of maximal focus. At the same time, the focusing speed is generally reduced when the work is carried out at a greater magnification, for example. Something similar applies if the resolution experiences an increase.

Furthermore, the focusing speed is adapted to the depth of focus. It is known that the depth of focus refers to the expanse of a spatial zone in front of the optical unit, i.e. the lens used at this point, which is (just barely) imaged in focus by it. The depth of focus increases with an increasing recording distance and shutter setting, i.e. a lower shutter, while it decreases with an increasing nearness of the object. Lenses having a short focal width guarantee a greater depth of focus. In fact, the depth of focus is in inverse proportion to the square of the numerical aperture of the related lens. Consequently, the focusing speed (in the Z direction) is also a function of the numerical aperture, in other words it, like the depth of focus, depends on the square of the numerical aperture, in inverse proportion.

Furthermore, the image field size of the lens used, i.e. its field angle, in other words, in the final analysis, the magnification, influences the focusing speed.

All of the variables mentioned above, in other words the resolution of the scanning unit, the magnification of the optical unit, the numerical aperture of the optical unit, the contrast or contrast value of the individual image recorded, in each instance, etc., are evaluated by the adaptive sensor as parameters, and determine the focusing speed.

In addition, the adaptive sensor can predetermine not only the focusing speed as a function of the aforementioned parameters, particularly as a function of the image field size, i.e. the field angle of the lens used, in each instance, but also a setting speed for the adjustment unit, i.e. the one or more adjustment units implemented at this point. For example, when using a lens having a small image field size or small field angle, for example a telephoto lens, one will work with lesser setting speeds for the adjustment unit. If, on the other hand, a normal or wide-angle lens with a greater field angle is being used, the setting speed for the adjustment unit can also be increased by the adaptive sensor. In total, the setting speed of the adjustment unit can be selected to be reciprocal to the magnification. The greater the magnification, the smaller the setting speed, and vice versa. Recording of the contrast values can additionally be flanked in that in fact, only those regions of the sample that are of interest experience examination. For this purpose, a rough overview image and a related histogram can first be taken. The histogram of an image, i.e. an individual image makes a statement about the number of pixels having the related gray value. It can be presented in table form or graphic form. For this purpose, the gray values are regularly plotted on the X-axis or abscissa, and the number of pixels that have the related gray value are plotted on the ordinate.

Usually, the region of the sample is characterized by a characteristic histogram, while practically only gray values close to zero, i.e. white regions are observed outside of that—in the sample-free space. As a consequence of this, the related histogram with gray-value thresholds can be used for binarization. In this case, the image is converted into an image of white and black regions, i.e. the corresponding regions are stored in memory.

Alternatively or in addition, it is possible to mask the white regions that are not of interest, below the predetermined gray-value threshold, so that in the final analysis, only the mask-free regions are available for the subsequent analysis of the contrast values. In any case, a distinction can be made, in each instance, between sample-free regions and those having sample, i.e. between white and black or masked and non-masked regions. As a result, the binarization described, i.e. the division of the total image into at least two regions, takes place.

In any case, a determination can be made, in this manner, to the effect that only the regions of the sample that are actually relevant (non-masked) are subjected to the procedure described for determining the contrast values. These are the significant advantages.

Figure 6:
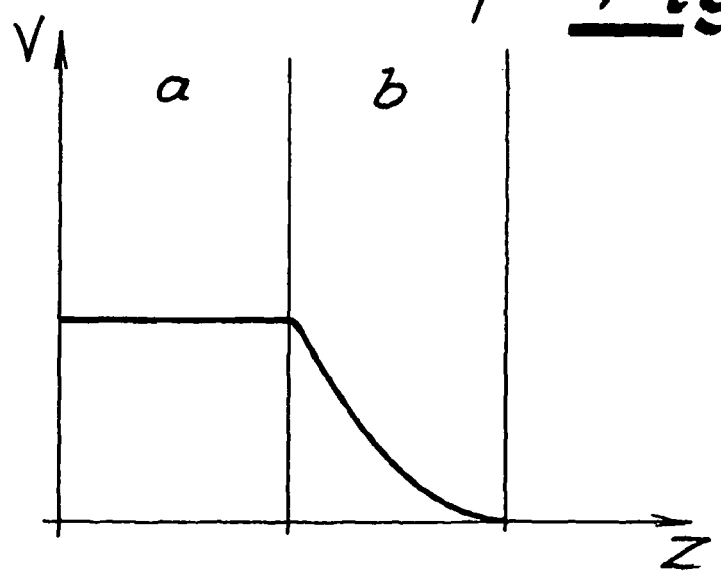
Figure 7:
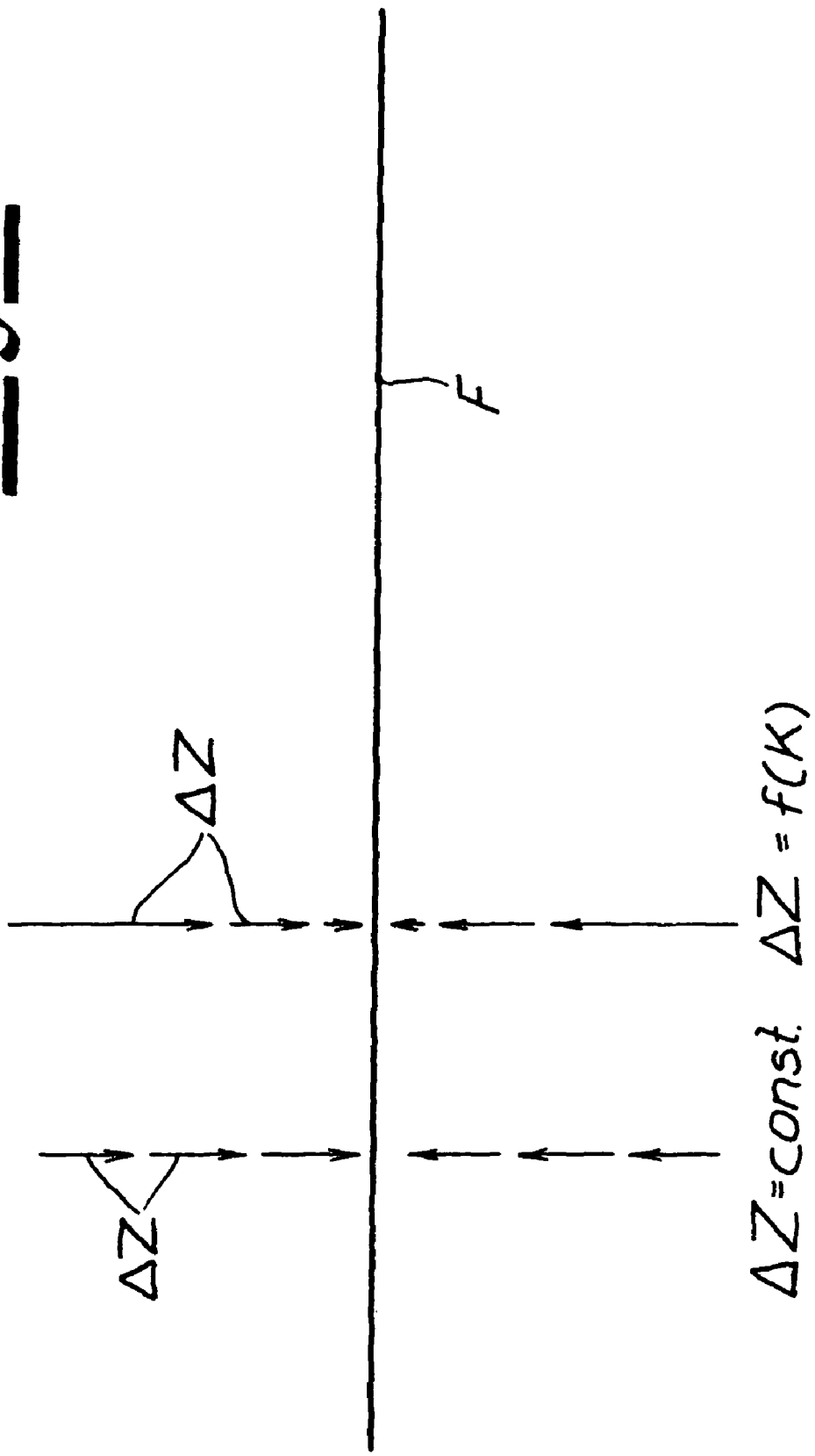
Figure 8:
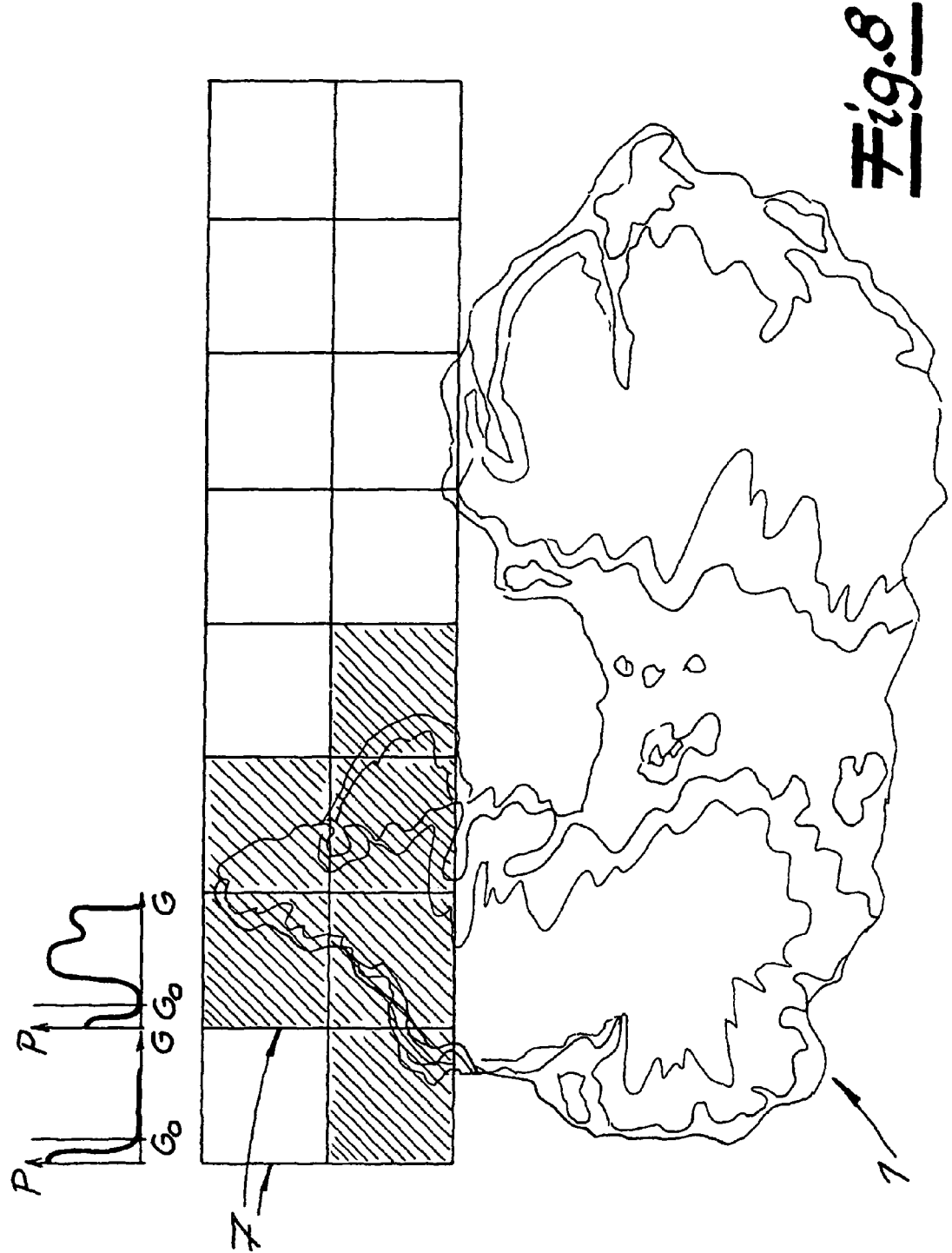

In the following, the invention will be explained in greater detail using a drawing that shows an embodiment merely as an example; this shows:

FIG. 1 a device according to the invention in an overview,

FIG. 2 a detail from FIG. 1,

FIG. 3 two stacks of individual images, to illustrate the selection of individual images, FIG. 4 different individual images as well as the sharp regions in these images, by sections, FIG. 5 the contrast value as compared with the adjustment of the optical unit in the Z direction, FIG. 6 the speed for adjustment of the optical unit, i.e. for focusing, FIG. 7 the focusing process, schematically, and FIG. 8 a sample topology with related histograms, for defining the region of interest.

In the figures, a device for optically scanning a sample 1 is shown, which sample is a transparent biological tissue section, but this is not a restriction. This tissue section, i.e. the sample 1 is transilluminated by a white-light source W, which is situated below an adjustment unit 2, 3. The adjustment unit 2, 3 is composed of setting devices 2 as well as a table 3, which holds and moves the sample 1, which is usually placed on an object carrier.

Using the setting devices 2, the table 3 can be displaced in the X/Y direction, in the case of the example, so that different regions of the sample 1 are ready to be recorded. Of course, it lies within the scope of the invention to also adjust the table 3 in the Z direction, if necessary. However, this is not shown. The light emitted by the white-light source W transilluminates the sample 1, and is recorded by a scanning device 4, 5, as shown in FIG. 2. The scanning device 4, 5 is composed of several lenses 4 as an optical unit 4, which optionally image image sections of the sample 1, having different sizes, on a scanning unit or recording unit 5. The recording unit 5 is a CCD chip having $1 \cdot 10^6$ pixels, for example. The image of the transmitted sample 1 produced on the CCD chip is recorded in a control system 6 as an individual image 7. Multiple individual images 7 form a total image, as shown in FIG. 8. The control system 6 controls the setting device 2, i.e. the adjustment unit 2, 3, as well as the optical unit 4 and also the scanning unit 5. This means that the sample 1 is examined by means of transmission measurements.

Within the scope of the invention, the individual image 7 recorded, in each instance, is evaluated, in whole or in part, with regard to its contrast (see, for example, FIG. 5). This means that the individual image 7 is identified with a (single) contrast value K, within the framework of the exemplary embodiment. Of course, multiple contrast values K can also be defined for every individual image 7, specifically if the individual image 7 is divided into several different sectors or sections 8, in accordance with the representation according to FIG. 4. This is because in such a case, one can identify each section 8 with its own contrast value K.

Within the scope of the exemplary embodiment and without restriction, the contrast value K corresponds to the mean quadratic deviation $\sigma_G^2$, in accordance with Equation ② that was already indicated above. The higher the value of $\sigma_G^2$, the greater the value K, and consequently the greater the contrast of the individual image 7. The optical unit 4 can be automatically focused by way of the contrast, i.e. the related contrast value, because a focused image is characterized by greater contrast than a non-focused image. This will be explained in greater detail below.

In fact, the contrast values K of the individual images 7 that are obtained are used to influence the method of functioning of the entire device shown. This includes, first of all, as an option, movement of the optical unit 4, specifically in the Z direction, to change the focusing on the sample 1. Conclusions concerning the displacement of the adjustment unit 2, 3 by means of the control system 6 can also be drawn from the contrast values K that are obtained. Finally, the contrast values K influence the values read out from the scanning unit 5 by the control system 6. This happens, in detail, as follows.

First, in order to record the total image, the sample 1 is optionally recorded in rough manner and with low resolution of the scanning device 4, 5, in the control system 6. For this purpose, the adjustment unit 2, 3 is controlled in speedy manner, so that the entire region of the sample 1 is moved through once, along a meander or serpentine line, for example. In this connection, the rough image corresponding to FIG. 8 is formed. In order to now filter out the sample regions that are actually of interest, which are examined with regard to their contrast in a subsequent step, a histogram of the individual image 7 is produced in the control system 6, in each instance, as shown as an example for the two upper images in FIG. 8. The histogram makes a statement, in graphic form, about the number of pixels P having the related gray value G.

One can see that the left upper image has practically only pixels P having a low gray value G, consequently the related individual image 7 is "white." In contrast, the individual image 7 to the right of it already has sample components and has not only a "white" component in the vicinity of the origin, but also sample components, which are characterized by essentially two gray-value maxima in the example. If one now ignores all of the individual images 7 whose histogram exclusively shows gray values G below the threshold value $G_0$ in accordance with FIG. 8, in the control system 6, in fact only the individual images 7 that actually cover sample regions will be taken out and examined during the subsequent process. In FIG. 8, the individual images 7 that are of interest are shown with hatched lines, in each instance, while the sample-free regions and related individual images 7 are shown in white. In this manner, a significant acceleration of the process can already be achieved during scanning of the sample 1; the steps described below also, and particularly, contribute to this.

In order to now join the individual images 7 that are of interest and have been cross-hatched into a total image, it is necessary for the adjustment unit 2, 3 to move to the position belonging to the individual image 7, in each instance, and subsequent to this, for the scanning device 4, 5 to record and take the individual image 7 in question. This is done, in detail, in such a manner that a stack 9 of individual images, in accordance with FIG. 3, is taken at the related position X;Y of the adjustment unit 2, 3, in each instance. There, for reasons of a simpler illustration, one can only see two stacks 9 of individual images, whereby the one stack 9 of individual images corresponds to the position X1, Y1, while the other stack 9 of individual images was taken at the position X2, Y2 (of the adjustment unit 2, 3). The individual images 7 of the stack 9 of individual images are recorded as a function of the focusing of the optical unit 4. This means that every individual image 7 belongs to a value of the focusing of the optical unit 4, i.e. to a Z value.

For this purpose, in the simplest case, the optical unit 4, i.e. the microscope lens implemented at this point, is moved vertically relative to the table 3, by means of the control system 6, so that the work is carried out with different focusings at the position X; Y in question. This focusing can take place manually and/or automatically using the control system 6.

In the example, a quasi semi-automatic focusing is implemented, in that an operator changes the vertical position of the optical unit 4 above the table 3, and consequently its Z position, by activating a hand wheel 10 on the scanning device 4, 5. In this connection, however, corresponding manual movements are not directly converted to a Z adjustment of the optical unit 4, but rather this happens with the interposition of the control system 6. In fact, the hand wheel 10 is equipped with an angle of rotation transducer, which reports the angle of rotation position and consequently the adjustment of the hand wheel 10 to the control system 6. The control system 6 derives an adjustment path for the optical unit 4 in the Z direction, and also a focusing speed V, i.e. the speed at which the individual images 7 of the stack 9 of individual images are taken, from this operator wish.

In this connection, the focusing speed V, which is predetermined manually and/or automatically, in other words the adjustment speed of the optical unit 4 in the Z direction, is not converted directly 1:1 by an adjustment device 11 connected with the control system 6. Instead, the focusing speed V is a function of the contrast value K of the individual image 7 that is taken, in each instance, and is predetermined by the control system 6, which activates the corresponding adjustment device 11, as a function of the contrast value K, in each instance. Furthermore, the focusing speed V might depend on additional parameters T, if applicable, which were already indicated above (magnification, depth of focus of the optical unit 4, resolution of the scanning unit 5, etc.).

In this connection, the invention proceeds from the assumption that the six individual images 7 of the stack 9 of individual images, in the case of the example, correspond to different focus values K, as shown in the upper graphic of FIG. 5. The more one approaches the sharpest, i.e. most contrast-rich individual image 7, in each instance (in the case of the example, at the position $X_1, Y_1$ with the number 3), the greater the contrast value K of the individual image 7. In fact, the contrast value K follows a curve having a maximum that corresponds to the individual image 7 (having the number 3) in the focus. The contrast value K is therefore a function of the Z adjustment, i.e. K=K (Z), or K=K (Z, T) if one or more of the aforementioned parameters T play a supplemental role. Furthermore, the focusing speed V is dependent on K, in other words V=V (K) applies, and accordingly V=V (Z) applies, as FIG. 6 shows.

If one now forms the derivation of this function, i.e. dK/dz in the control system 6, the maximal value of the contrast values K can be identified with the zero point of the derivation, as the graphic of the derivation in FIG. 5 makes clear. At the same time, the derivation dK/dz permits conclusions as to the side from which the maximum of the contrast value K is being approached. This is shown by corresponding arrows in FIG. 5, top. Depending on the region in which the optical unit 4 is situated, of course, the direction of focusing can be changed. At the same time, the focusing speed V also undergoes a variation or change of direction.

In the region in which the contrast value K increases greatly from individual image 7 to individual image 7, one will usually work at a great (constant) focusing speed V, which is present in FIG. 6 in the left part a (see also FIG. 5). This speed V is maintained until the derivation dK/dZ does not go below certain values (for example zero). If, however, the incline of the contrast value K over the Z component decreases, i.e. one approaches the plateau of focusing, the control system 6 switches over to a lesser focusing speed V and decreases it successively, if necessary. This is expressed in FIG. 6, in the right part b, and also in FIG. 5 and FIG. 7, which compares the previous method of procedure in the left part with the method according to the invention on the right. One can see that until now, the work was carried out at a constant focusing speed V, consequently the adjustment intervals ΔZ in the Z direction were constant.

According to the invention, however, the work is now carried out with greater intervals in the Z direction ΔZ, which decrease with an increasing approach to a focusing plane F, i.e. to the maximum of the contrast value K. In the case of the example of FIG. 3, the image 3 is at approximately this focal plane F at the position X1, Y1. In contrast, the image 5 at the position X2, Y2 is placed in or in the vicinity of the focal-plane F (emphasized by a thicker line, in each instance).

In any case, the adjustment intervals ΔZ in the Z direction of the optical unit 4 are a function of the focus value, i.e. the contrast value K, according to the invention, and of the parameters T, if applicable. In this connection, the individual images 7 of the stack 9 of individual images, in each instance, are recorded at a predetermined (constant) focusing speed V (in the region a of FIGS. 5 and 6), whereby this focusing speed V is slowed down with increasing contrast values K of the individual images 7, in each instance, as can be seen in the region b of FIGS. 5 and 6. In this connection, the focusing speed V can be adjusted in such a manner that it drops to zero or almost zero when the focal plane F is reached.

Instead of varying the focusing speed V and reducing it in the region b of FIGS. 5 and 6, it is also possible to work at a constant speed and then an increased distance in the Z direction of the individual images. This means that in this case, the six individual images 7 shown in FIG. 5 are not taken at an equidistant distance in the Z direction, but rather while approaching the focal plane F, with an increasing distance in the Z direction. In this case, the curves shown in FIG. 5 are therefore "stretched" in the region b. As a result, the same effect is achieved as when the focusing speed V is reduced as described.

Instead of identifying each individual image 7 with only one contrast value K, the individual image 7, in each instance, i.e. the regions of the sample 1 that are of interest and were previously selected (cross-hatched) can alternatively be examined by sections. For this purpose, the individual image 7, in each instance, can be divided into four sections 8, for example, in accordance with the representation in FIG. 4. When the stack 9 of individual images is taken, it is no longer every individual image 7 that is identified with a contrast value K, but rather related contrast values $K_1$ to $K_4$ are defined per individual image 7, for the section 8, in each instance. This is expressed in FIG. 4 by the modified stack 9 of individual images also shown there.

One can see that in the case of the example, the first section $8_1$ reaches the maximum of its contrast value $K_1$ in the individual image 7 having the number 4. However, the most contrast-rich section $8_2$, having the contrast value $K_2$, corresponds to the individual image 7 having the number 3. Finally, the section $8_3$ having the number 5 in the individual image 7 lies in the vicinity of the focal plane F, while this is the case for the section $8_4$ having the contrast value $K_4$ in the case of the individual image having the number 2.

According to the invention, these individual most contrast-rich sections 8 of the related individual images 7 having the numbers 4, 3, 5, and 2 are now combined into a combined individual image 7. In this way, the stack 9 of individual images can be recorded at a practically unchanged high focusing speed V, as an alternative to reducing the focusing speed V. In both cases, a particularly contrast-rich individual image 7 is available at the end, whereby, of course, both methods of procedure, i.e. the selection by sections and the reduction in focusing speed V, can also be combined with one another. In the final step, the total image shown in FIG. 8 can be obtained from the individual images 7 obtained in this manner, in that the individual images 7 are combined to produce the total image, either butting against one another or with overlap.—An adaptive sensor unit 12 in the control system 6 and/or in the scanning device 4, 5, as shown in FIG. 1, assures the determination of the contrast values K of the individual images 7. The sensor unit 12 predetermines the focusing speed V as a function of the contrast values K and the parameter T, in each instance, in that the sensor unit 12 activates the connected control system 6 accordingly, which in turn controls the adjustment unit 2, 3 and/or the optical unit 4, for example.

The adaptive sensor unit 12 in the control system 6 and/or in the scanning device 4, 5 not only assures a determination of the focusing speed V, within the scope of the exemplary embodiment and also otherwise. In fact, the adjustment unit 2, 3 can also be influenced using the sensor unit 12 in question. For example, a lesser magnification of the optical unit 4 ensures that the table 3 is moved at a minimized speed, in the X/Y direction, in the case of the example. Overly great accelerations of the adjustment unit 2, 3 during optional manual operation, as well as of the lens 4, using the hand wheel 10, can be corrected, i.e. influenced in the sense that only certain maximal accelerations are permitted.

The adaptive sensor unit 12 always ensures that conclusions for the operation of the entire system are drawn from the contrast values K of the individual image 7 being recorded, in each instance, for example to the effect that the focusing speed V is varied. In addition, the adjustment speed of the adjustment unit 2, 3 relative to the scanning device 4, 5 can also be influenced. This influence is predetermined not only by the contrast values K in question, but optionally also by the additional parameters T, which in total influence the movement of the optical unit 4 and/or that of the adjustment unit 2, 3 by means of the control system 6. The same applies, alternatively or in addition, to the values read out of the scanning unit 5 by the control system 6. This read-out speed can also undergo a change by the adaptive sensor unit 12 as well as the parameters T mentioned, if applicable. The question as to whether and with what overlap the individual images 7 are combined to produce the total image shown in FIG. 8 can also be varied as a function of the defaults of the adaptive sensor unit 12. For example, when individual images 7 are taken rapidly, one will select the overlap to be large, whereas individual images 7 composed of individual contrast-rich sections 8 will tend to require a lesser overlap when they are combined to produce the total image.

The invention claimed is:

1. A method for optically scanning a sample, having an adjustment unit and a scanning device having an optical unit and a scanning unit, and having a control system that controls the optical unit, the scanning unit, and the adjustment unit, comprising the following steps:
    moving the sample relative to the scanning device by means of the adjustment unit activated by the control system or the control system activated by the adjustment unit,
    combining individual images obtained with the scanning device in the control system to produce at least one total image,
    evaluating the contrast of each individual recorded image in whole or in part by means of an adaptive sensor unit,
    wherein contrast values (K) obtained during said step of evaluating influence the method of functioning of the entire system,
    wherein the optical unit is focused by means of the control system or manually, and
    wherein a related focusing speed (V) is predetermined by the control system as a function of the contrast values (K) of each individual image recorded.

2. The method according to claim 1, wherein the contrast values (K) influence movement of the optical unit or movement of the adjustment unit by means of the control system or by means of values read out of the scanning unit by the control system.

3. The method according to claim 1, wherein a stack of individual images is recorded at every position or selected positions of the adjustment unit, as a function of the focusing of the optical unit.

4. The method according to claim 1, wherein the individual images are recorded at a predetermined focusing speed (V) of the optical unit, said focusing speed being slowed down with increasing contrast values (K) of each individual image.

5. The method according to claim 1, wherein a direction of the focusing speed (V) of the optical unit is reversible, based on an increase in the contrast values (K) of the individual images.

6. The method according to claim 1, wherein each individual image or selected individual images are examined in sections, with regard to their contrast, and the most contrast-rich sections or individual images are combined to produce the combined individual image or total image, respectively.

7. A device for optically scanning a sample, comprising:
an adjustment unit;
a scanning device having an optical unit and a scanning unit; and
a control system that controls the optical unit, the scanning unit, and the adjustment unit,
wherein the sample is moved relative to the scanning device, by means of the adjustment unit activated by the control system or the control system activated by the adjustment unit
wherein individual images obtained with the scanning device are combined in the control system to produce at least one total image,
wherein the control system has an adaptive sensor unit that evaluates the contrast of each individual image, in whole or in part,
wherein contrast values (K) obtained in this manner control the method of functioning of the system,
wherein the optical unit is focused by means of the control system or manually, and
wherein a related focusing speed (V) is predetermined by the control system as a function of the contrast values (K) of each individual recorded image.

8. The device according to claim 7, wherein the optical unit is displaced in a Z direction by a motor, using an adjustment device, controlled by the control system.

9. The device according to claim 7, wherein a hand wheel is provided for manual focusing of the optical unit, and wherein signals of said wheel are evaluated by the control system for moving the optical unit.

* * * * *